Oct. 13, 1959     B. B. STERN     2,908,150
FLEXIBLE SHAFT COUPLING STRUCTURE
Filed Feb. 17, 1959            2 Sheets-Sheet 1
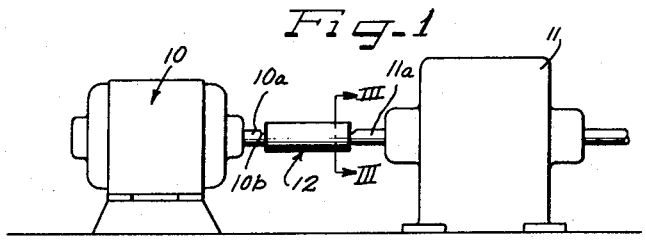
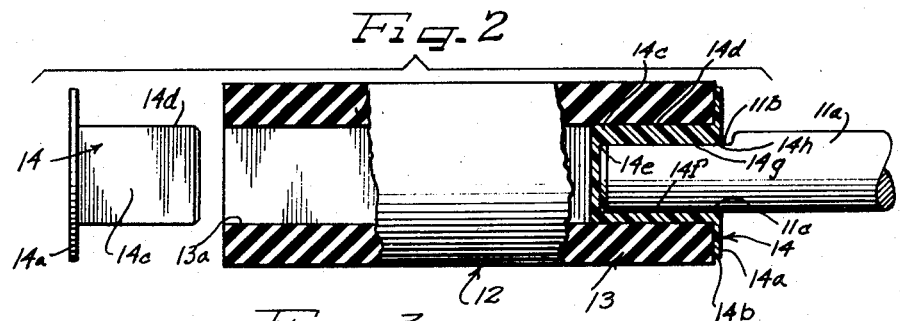
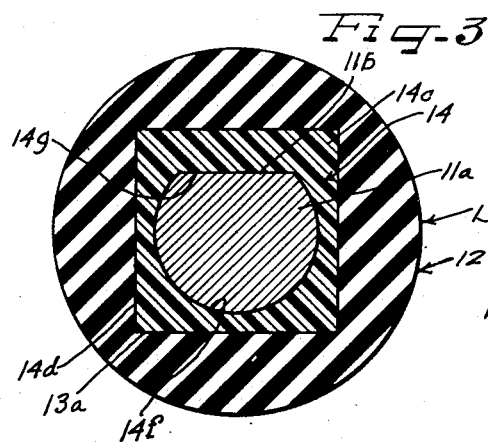
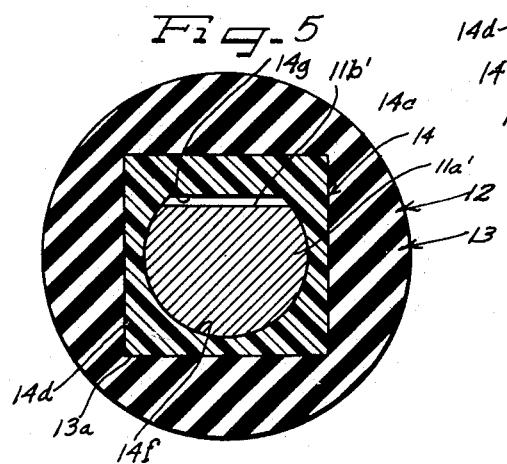
Inventor
Benjamin B. Stern

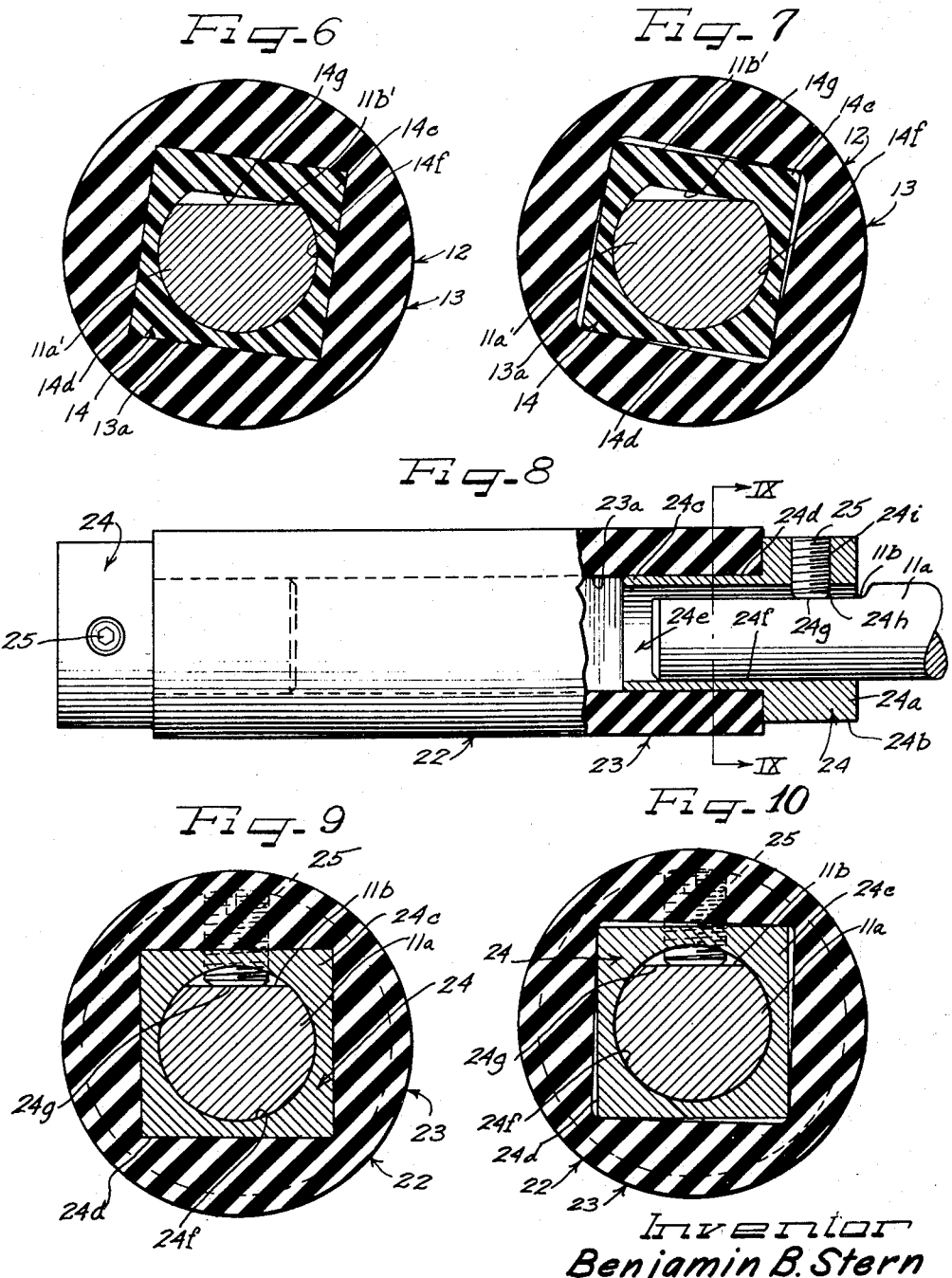

United States Patent Office 2,908,150
Patented Oct. 13, 1959

2,908,150

FLEXIBLE SHAFT COUPLING STRUCTURE

Benjamin B. Stern, Chicago, Ill.

Application February 17, 1959, Serial No. 793,867

3 Claims. (Cl. 64—11)

The present invention relates generally to flexible coupling structures. More particularly, the present invention is concerned with new and improved flexible coupling structures which have an extended life expectancy by reason of their unique construction.

A first feature of the present invention concerns the provision of means for reducing the tendency of surge loads to whittle away a flat portion of a generally D-shaped bore.

A second feature of the present invention concerns the provision of new and improved means on the flexible coupling to dampen and absorb vibration.

A third feature of the present invention concerns the efficient economical design of the instant flexible coupling structures which incorporate the means described in the first and second features above.

With respect to the first feature, as described above, previous couplings of the type having a D-shaped bore have had a common fault in that there has been no provision of means to reduce or substantially eliminate the tendency of surge loads to whittle away the flat portion of the D-shaped bore, which whittling action occurs as a consequence of the variance in the depth of the flat portion of the drive shaft with respect to the flat portion of the drive shaft. In the industry there is no definite standard established for the depths of the flat portions on the shafts.

In order that the D-shaped bore on the flexible coupling structure fit all extremes of the flat, it has been necessary to make the flat coupling portion of the bore small enough to fit the shallowest flat normally encountered on the standard motor shaft.

Where the flat portion on the shaft is of a very deep type, play will develop between the shaft flat and the bushing flat when the shaft and the coupling are engaged together. During operation, repeated starts and surge loads tend to whittle away the bushing or coupling flat, and this wear is compounded as more play is developed between the flat portions. As a consequence of the play between the flat portions, the bushing flat will frequently be completely sheared off.

According to certain features of the present invention, and in order to alleviate this undesirable shearing effect, allowance for momentary displacement of the coupling components is provided. Under shock or heavy torsional stress, the corners of the bushing act to wedge the unconfined resilient rubber member outwards, and this instant release of the bushing from its normal fixed position enables the bushing to turn slightly in the direction of the load, which damps the reaction of said bushing to the sudden shearing blow of the shaft. The resultant damping of the reactive force is a utilization of a natural law in physics, and could be similarly compared to a situation where an attempts is made to drive a nail into a loose piece of wood.

According to the instant coupling construction, particular note should be made of the fact that the rubber sleeve is unconfined at its periphery to permit the periphery of the sleeve to be displaced. Rubber is displaceable, but is not generally compressible. Heretofore, couplings, such as shown in the Skidmore, Jr., Patent No. 1,646,427, the Fabbri et al. Patent No. 2,857,749 and the Case Patent No. 2,859,599 all trap the rubber sleeve within the end assembly, which precludes quick release and radial displacement of the rubber sleeve.

It is further noted that the displaced rubber sleeve acts as a non-linear hard spring, in that resistance to continued displacement increases at a proportionately higher rate than the stress imposed by the load, or in other words, resistance to deformation in a rubber body is accumulative, and this prevents the rubber sleeve from distending to a point where driving relationship is lost.

According to the second feature of the present invention, as described above, the displaceable bushing, when twisted, has the effect of placing the assembly, under load, in a condition of static deflection of low frequency, as a non-linear hard spring thereby operating to damp and absorb vibration.

If the imposed frequency of vibration is, for example, at least equal to the standard motor of 1725 r.p.m., and the natural or low frequency of the coupling assembly is considerably lower, as would be the case, then a considerable portion of the vibration will be absorbed instead of transmitted.

The effectiveness of this vibration insulation is determined by the ratio of imposed vibration divided by the natural frequency of the coupling assembly. The reference to the non-linear hard spring action points up the fact that the natural frequency in the coupling assembly is slow enough to preclude resonance, while giving a high insulation ratio.

As a consequence of the development of the second feature, the damping of vibrations serves to alleviate the eroding action of bushing flat and to reduce the effect of vibration. The action of the floating bushings, therefore, complements and improves the action of the resilient coupling.

According to the third feature of the present invention, the use of the square bore is highly advantageous since such a bore is the most easily generated shape (except for a round bore) to be found in the mechanical arts. As such, it can be produced accurately and at comparatively low cost. By using a square bore, any rubber manufacturer with a nominal skill and a minimum of special equipment can produce the rubber sleeve as an extruded part of substantially continuous length, which is one of the most economical processes found the rubber industry.

The manufacture of the molds to produce the synthetic or nylon bushing is also simplified by selecting the square type bore since both the mold and the finished parts may be accurately produced at a minimum of cost in a manner whereby the parts may be readily interchanged.

In view of the foregoing, it is an important object of the present invention to provide a new and improved flexible coupling structure.

Still another important object of the present invention is to provide a new and improved flexible coupling structure having an extended life expectancy.

Yet another object of the present invention is to provide a new and improved flexible coupling structure which may be economically mass produced.

Other objects and features of the present invention will more fully become apparent in view of the following detailed description taken in conjunction with the accompanying drawings, illustrating therein several embodiments, and in which:

Figure 1 is a side view of a shaft coupling structure coupled to a motor and a speed reducer;

Figure 2 is an enlarged exploded view, partly in elevation and partly in section, of the flexible coupling structure in engagement with a shaft;

Figure 3 is an enlarged cross-sectional view taken substantially on the line III—III looking in the direction indicated by the arrows, as shown in Figure 1;

Figure 4 is an enlarged cross-sectional view similar to Figure 3 only showing the components when subjected to a twisting force;

Figure 3 is an enlarged cross-sectional view similar to Figure 3 only with the flat portions being disengaged and shown in a static position;

Figure 6 is an enlarged cross-sectional view similar to Figure 5 only illustrating the components when subjected to a torsional stress;

Figure 7 is an enlarged cross-sectional view similar to Figure 6 only showing the coupling components as they appear when subjected to further stress;

Figure 8 is an enlarged side elevation of a modified flexible coupling structure, only with certain parts shown in section and with a shaft engaged with the coupling structure;

Figure 9 is an enlarged cross-sectional view taken substantially on the line IX—IX looking in the direction indicated by the arrows, as shown in Figure 8; and Figure 10 is an enlarged cross-sectional view similar to Figure 9 only illustrating the components of the coupling structure after being subjected to a torsional force.

On the drawings:

The reference numeral 10 in Figure 1 indicates generally a conventional motor having a drive shaft 10a. Also shown in Figure 1 is a structure to be driven by the motor which is illustrated in the form of a speed reducer, indicated generally at 11. The speed reducer 11 is also provided with a shaft 11a. The shaft 10a and 11a both are provided with tip ends of generally D-shaped configuration and each are provided with a shaft flat, as indicated at 10b and 11b.

According to the present invention, a flexible coupling structure 12 has been provided to connect the shafts 10a and 11a together to permit the motor 10 to drive the speed reducer 11.

The flexible coupling structure 12 is comprised of a tubular sleeve 13 and a pair of bushings 14, 14.

The tubular sleeve 13 has a square-shaped wall area defining a sleeve bore, which is indicated at 13a. The bushings 14, 14 are engageable within the bore 13a and together comprise the flexible coupling structure 12.

The bushing structure 14, as shown in Figures 2-7, includes a headed or cap portion 14a having an outside circular surface 14b which corresponds generally to the outside surface and diameter of the sleeve 13. Connnected to the headed portion 14a is a shank or reduced bushing portion 14c. The bushing portion 14c has a square-shaped external bushing surface area indicated generally at 14d which is adapted to frictionally engage with the square-shaped sleeve wall area 13a and thereby maintain the bushing in assembly with the sleeve.

In the illustrated form shown in Figures 2-7, the bushing 14 has a centrally located square-shaped surface area or recessed area indicated generally at 14e. The D-shaped surface area 14e includes an arcuate generally semicircular bushing surface area 14f and a bushing flat or flat bushing surface 14g. At the open end of the recessed area 14e generally radially outwardly of the bushing flat 14g is a bushing lead-end surface 14h which operates to aid in the centering of the shaft 11a as it is engaged within the recessed area 14e.

Figure 3 shows the components of the flexible coupling structure 12 including the sleeve 13 and the bushing 14 in a static position with the flat surfaces on the shaft 11a and on the bushing 14 in mated abutting engagement together. When such an assembly is subjected to a twisting or torsional force as would occur when the motor 10 is started up, the motor drive shaft 10a will twist the flexible coupling structure in the manner shown in Figure 4 whereupon the driving force will be transmitted to the driven shaft 11a. Figures 3 and 4 are provided to illustrate the second feature, as previously described whereby the sleeve acts as a non-linear hard spring serving to damp and absorb vibration in the manner previously described.

In Figures 5-7, a modified shaft 11a' has been provided which is identical with the shaft 11a except that the depths of the shaft flat 11b' is reduced as compared to the depths of the shaft flat 11b. In Figure 5 the components of the flexible coupling structure are shown in a static position, as compared to Figures 6 and 7. In connection with the first feature, previously described, the shaft flat 11b' and the bushing flat 14g, when in a static position, are disposed in generally parallel relation. After the motor shaft 10a begins rotation, the rotary action is transmitted to the coupling 12 to cause the shaft flat 11b' to engage at one end or side with the bushing flat 14g. In order to alleviate the undesirable shearing effect, present in commonly used flexible coupling structures, allowance is made for momentary displacement of the sleeve 13. In this connection it will be appreciated the sleeve 13 is preferably comprised of rubber and the bushings 14 are preferably comprised of a synthetic material such as nylon and the like. Under shock or heavy torsional stress, the corners of the bushing act to wedge the unconfined resilient rubber sleeve material radially outwardly, and this instant release of the bushing from its normal fixed position enables the bushing to turn slightly in the direction of the load, which damps the reaction of the bushing to the sudden shearing blow of the shaft. It is in this manner that constant starts and surge loads are prevented from wearing away the bushing flat portion.

As was described in connection with the second feature, and where the low frequency of the coupling structure is lower than the motor, then a considerable portion of the vibration transmitted to the coupling structure will be absorbed by the coupling structure instead of being transmitted to the shaft 11b'. The damping of the vibration serves to alleviate the eroding action of the shaft on the bushing flat 14g as well as to reduce the transmission of vibration to the shaft 11b'.

In Figures 8, 9 and 10 is shown a modified coupling structure indicated generally at 22 and which includes a sleeve 23 which is identical to the sleeve 13. Mounted on the sleeve 23 are a pair of bushings 24, 24 which together comprise the coupling structure 22.

The bushing 24 is substantially identical to the bushing 14 except that a set screw 25 is provided, and which may be utilized to eliminate play between the shaft and the coupling structure when the screw is turned into abutting engagement with the shaft.

The sleeve 23 includes an inner square-shaped surface or wall sleeve area 23a. The bushing 24 includes a headed portion 24a having an external radially facing peripheral surface area 24b which is slightly reduced in diameter as compared to the outside surface area of the sleeve 23. Mounted on the headed portion 24a is a bushing shank or a shank portion 24c which is provided with a square-shaped external surface area 24d which is adapted to engage with the corresponding sleeve area 23a in the same manner as previously described in the first form of the invention.

The bushing 24 is also provided with a recessed area or tubular area or generally D-shaped surface area as is indicated generally at 24e. In this respect it will be appreciated an arcuate portion 24f of the bore 24e is cooperable with an end or flat bushing or screw flat 24g which is engageable with the flat portion 11b of the shaft 11a. The screw or bushing is also provided with a lead-in surface area 24a which may function in the same manner as the lead-in surface area 14h.

The sleeve 23 and the bushings 24 may be comprised of the same materials as the corresponding parts provided on the coupling structure 12 but as shown, the bushing is comprised of a suitable hard metal such as steel. The components of the coupling structure 23 are shown in a static position in Figure 9 as contrasted to Figure 10 where the coupling structure 22 are shown as being subjected to a rotary or surge action. As is shown in Figure 10, the bushing and the sleeve cooperate together to dampen vibrations of the type described above in connection with the second feature. In other words, the sleeve operates as a non-linear hard spring to damp and absorb vibration.

The square sleeve bore has been again provided as in the first form of the invention to enable the sleeve to be manufactured at a minimum of cost.

Since the set screw 25 is normally engaged with the shaft flat 11b there is no play between the set screw and the shaft flat as was present in the first form of the invention. However, should play develop between the shaft flat 11b and the bushing or screw flat 24g, the coupling components would function in the same manner as described above in connection with the first feature of the invention.

It will be understood that modifications and variations may be effected without departing from the scope of the novel concepts of the present invention.

I claim as my invention:

1. In a flexible coupling structure, a tubular sleeve including a radially outer sleeve surface area which sleeve is comprised of a suitable deflectable material such as rubber, the sleeve having an internal tubular wall area provided with angular sleeve corners, and means at the opposite ends of the sleeve for effecting connections with members to be coupled, at least one of said means being a headed bushing which has head shank portions telescopingly engaged with said tubular wall area, the bushing having a central area for receipt of a shaft, the head portion being in abutment with an end of the sleeve leaving the radially outer surface area free of the bushing and its head portion, the shank portion having its external surface area provided with angular bushing corners in abutting engagement with the angular sleeve corners, the sleeve material at the area of the angular sleeve corners being displaceable radially outwardly upon the twisting of the sleeve and the bushing with respect to one another to damp the transmission of vibration from a drive shaft through the coupling structure, the sleeve functioning as a non-linear hard spring in that resistance to continued displacement of the sleeve material at the corners increases at a proportionately higher rate than the stress imposed by the load of the shaft.

2. In a flexible coupling structure including a shaft having a shaft flat, a tubular sleeve comprised of a suitable deflectable material such as rubber, the sleeve having an internal tubular wall area provided with angular sleeve corners, and means at the opposite ends of the sleeve for effecting connections with members to be coupled, at least one of said means being a headed bushing which has a shank portion telescopingly engaged with the tubular wall area, the bushing having a central area of generally D-shaped configuration for receipt of said shaft and which central area has a bushing flat spaced radially of the shaft flat, the shank portion having its external surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by the shaft flat to the bushing flat to prolong the useful life of the bushing.

3. In a flexible coupling structure including a shaft having a shaft flat, a tubular sleeve comprised of a suitable deflectable material such as rubber, the sleeve having an internal tubular square-shaped wall area provided with angular sleeve corners, and means at the opposite ends of the sleeve for effecting connections with members to be coupled, at least one of said means being a headed bushing which has a shank portion telescopingly engaged with said tubular wall area, the bushing having a central area of generally D-shaped configuration for receipt of said shaft and which central area has a bushing flat spaced radially of the shaft flat, the shank portion having an external square-shaped surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by the shaft flat to the bushing flat to prolong the useful life of the bushing while simultaneously dampening the transmission of vibration from a drive shaft through the coupling structure.

References Cited in the file of this patent

UNITED STATES PATENTS

| | | |
|---|---|---|
| 1,646,427 | Skidmore | Oct. 25, 1927 |
| 1,733,771 | Baker | Oct. 29, 1929 |
| 1,772,915 | Roseberg | Aug. 12, 1930 |
| 1,887,876 | Noble | Nov. 15, 1932 |
| 2,062,575 | Henry | Dec. 1, 1936 |
| 2,297,619 | Haberstump | Sept. 29, 1942 |
| 2,327,389 | Bagnall | Aug. 24, 1943 |
| 2,857,749 | Fabbri et al. | Oct. 28, 1958 |